Patented Nov. 23, 1943

2,334,762

UNITED STATES PATENT OFFICE 2,334,762

STABLE TALL OIL PRODUCT

Torsten Hasselstrom, Savannah, Ga.

No Drawing. Application December 11, 1939,
Serial No. 308,575

9 Claims. (Cl. 260—97.5)

The present invention relates to "sulfate black liquor" tall oil, and, more particularly, to stable "sulfate black liquor" tall oil, to stable solid tall oil rosin and to a process of producing the aforesaid stable tall oil products on an industrial scale.

It is well known in the paper and pulp industry that when black liquor from the sulfate process is evaporated, a scum, known as tall oil soap, separates and floats upon the surface of the black liquor. The tall oil soap which is skimmed off the evaporated black liquor is ready for treatment. The customary procedure is to add dilute sulfuric acid. Following this addition of acid, the mass separates into two layers, the upper of which contains crude tall oil. Many efforts have been made to use crude tall oil directly in commerce and industry in a practical and satisfactory manner, and to provide processes of treating the crude tall oil to make it available for satisfactory use in commerce and industry. These prior efforts have been unsuccessful for one reason or another and no completely successful and wholly satisfactory process has been provided for converting crude tall oil into an industrially and commercially useful and satisfactory product.

I have discovered a process of treating "sulfate black liquor" or the tall oil soap obtained therefrom to produce a refined tall oil and a rosin substitute possessing properties which make it valuable and useful as a commercial and industrial product.

It is an object of the invention to provide a simple, economical and practical process for carrying out my discovery on an industrial scale.

It is another object of the present invention to provide a means for producing from sulfate black liquor tall oil a heat-treated tall oil, the resin acids of which are stable.

It is a further object of the present invention to provide a stable solid tall oil rosin.

It is also within the contemplation of the invention to provide a process which is capable of being operated by relatively unskilled labor and which is capable of producing useful and valuable by-products including crude and refined tall oil rosin.

Other objects and advantages will become apparent from the following description of a preferred procedure for carrying the present invention into practice.

Black liquor produced in the sulfate process of producing pulp and paper is used as the raw material and is termed herein "sulfate black liquor" for convenience. The black liquor is evaporated until the tall oil soap separates. The exact specific gravity to which the black liquor must be evaporated before the tall oil soap separates depends upon the alkalinity and viscosity of the black liquor as one skilled in the art readily understands. When the black liquor has been evaporated as aforesaid, crude tall oil soap separates and floats on the surface of the evaporated liquor. By skimming off the floating scum, crude tall oil soap may be obtained.

The crude tall oil soap is treated with a suitable acid or acid substance, such as sulfuric acid or acid sodium sulfate, to liberate crude tall oil. In practice dilute sulfuric acid having a concentration of about 10–20% or an eight normal solution of acid sodium sulfate has been found to give satisfactory results. After the acid has reacted with the crude tall oil soap and has been permitted to settle, the mixture separates into two layers. The crude tall oil is in the upper layer and can be obtained by separating the upper and lower layers from each other. For instance, the upper layer can be removed from the lower layer by syphoning or by any other suitable procedure well known to those skilled in the art.

I have found that the crude tall oil, which is not very useful, can be converted into a highly useful refined product by removing certain constituents. These constituents can be removed satisfactorily by permitting the tall oil to stand for a period of time, say about 2 days to about 10 days or so at atmospheric temperatures. Among the constituents, which are practically completely removed, may be mentioned ligneous matters and higher saturated fatty acids. In addition, the refined product contains reduced amounts of oxidized colophonic acids and colophonic acids (classified according to Aschan's system) and reduced amounts of non-saponifiable matter than the crude tall oil. In practice, the foregoing constituents separate out from the tall oil on standing and may be removed by filtering, decanting, or the like. The filtrate is refined tall oil which is relatively stable and which is very useful commercially and industrially. Among the important uses, I have discovered for refined tall oil, soap making and flotation of certain ores of the alkaline earth metals may be mentioned. This latter discovery is described and claimed in applications, Serial No. 578,842, filed December 3, 1931 (United States Letters Patent No. 1,986,816), and Serial No. 648,215, filed December 21, 1932 (United States Letters Patent No. 1,986,817).

In some instances, the refining operation may be carried still further. For instance, by refrigerating the tall oil at a temperature within a range of about 25° C. to about minus 10° C., say about 0° C. and maintaining it at the refrigerated temperature for a period of say a week to ten days or so, with or without aeration, it is possible to remove further constituents from the tall oil. The solids which have separated from the liquid may be removed by filtering or the like. By this operation, odorous products, colophonic acids, oxidized colophonic acids, etc. are removed. The filtrate is a super-refined tall oil and is useful and available for additional purposes. Thus, it may be used for making laundry and other soaps.

In the event it is desired to de-colorize my refined or super-refined tall oil, it may be accomplished in any appropriate or well known manner. For instance, the refined or super-refined tall oil may be decolorized with carbon, fuller's earth, sulfur dioxide or the like in accordance with well known procedures.

It has also been found that the solids separated from the liquid tall oil can be melted together to form a product which can be used as a substitute for rosin. The solids may be used separately for the aforesaid purpose, if it is desired. It will thus be observed that the by-products are useful and valuable instead of being useless.

Although many attempts have been made to apply the experience obtained in the treatment of Scandinavian sulfate tall oil to the treatment of domestic tall oil, most of these efforts have failed. These failures undoubtedly have been at least partially due to the fact the Scandinavian tall oil differs from domestic tall oil. Furthermore the products produced by these prior art processes have not been concisely defined. Many of the prior art products and in fact practically all of the prior art products have been mixtures of two or more materials, which, due to the lack of knowledge of resin acids have not been defined with such particularity as to readily enable even experts in the art to recognize the components of these products. It will be appreciated that until recently the research work done on the resin acids of rosin and of tall oil has been very vague because of the difficulties encountered in the separation of the resin acids in the tall oil and the recognition of these resin acids as characteristic chemical individuals.

As has been shown by Hasselstrom and Bogert [J. A. C. S. 57 2118 (1935)], the original resin acids of the tree are l-sapietic and d-pimaric acids. However, it must be borne in mind that the resin acids of sulfate tall oil are not these original acids of the pine trees. When the pine tree is subjected to the alkaline pulping process (sulfate process), the sapietic acid is converted into Steele's abietic acid which is the terminal resin acid of sulfate tall oil press cake. [Hasselstrom and Bogert, ibid., 2120.] On the other hand when crude sulfate tall oil from a foreign source, as for example from Scandinavian pine is distilled there is isolated from the distillate an acid named by the original discoverers, Aschan and collaborators, pinabietic acid. [Aschan, Finska Kemistsamfundet 1917; Aschan, Naftenforeninger, Terpener och Kamferarter, Helsingfors, 353 (1936).]

In view of the fact that these investigators had not succeeded in obtaining a pinabietic acid of constant melting point and optical rotation, and in view of the fact that as shown in work done on American tall oil that Steele's abietic acid was present in American tall oil and not previously recorded as present in Finnish tall oil, it was deemed necessary to reinvestigate Aschan's pinabietic acid to determine more conclusively what its constituents were. A sample of Aschan's pinabietic acid was subjected to fractional crystallization substantially according to Aschan et al. [Aschan, Naftenforeninger, Terpener och Kamferarter, Helsingfors, 353, (1926)]. The main fractions were then sulfonated according to Hasselstrom (U. S. Patent No. 2,121,032). The sulfonation product was identified by its dimethyl ester as dehydroabietic acid sulfonate, thus proving that the pinabietic acid of Finnish tall oil contained dehydroabietic acid. By means of the lactone of hydroxy tetra hydroabietic acid it was proven that Finnish tall oil also contains dihydroabietic acid.

The resin acids in the mother liquors of the second fraction were converted to the acid sodium salt ($C_{19}H_{29}COONa.3C_{20}H_{30}O_2$) according to Palkin and Harris [ibid. 56 1935 (1934)] and then recrystallized to constant optical rotation. The product thus obtained, the acid regenerated therefrom and the subsequently prepared di-n-amylamine salt and the again liberated acid did not differ from the Steele-Palkin-Harris abietic acid and corresponding derivatives of the same. Thus it is evident that Finnish tall oil, in addition to containing dehydroabietic acid also contains Steele's abietic acid.

The last fraction of the pinabietic acid crystallizations, i. e., 0.6% of the original starting material, was converted into the di-n-amylamine salt. This salt and the recovered acid prepared therefrom did not show any constancy in melting point or optical rotation. Therefore it would appear that the highest melting fraction of pinabietic acid, and, consequently, Finnish tall oil in addition to the Steele's abietic acid and dehydroabietic acid contain small amounts of the dihydroabietic acid described by Ruzicka et al [Ruzicka, Bacon, Sternback and Waldman, Helv. Chim. Acta. 21, 59 (1938)], Hasselstrom et al. U. S. Patent 2,072,628, and Hasselstrom and McPherson [J. A. C. S. 61 1228 (1939)].

Great variations in optical rotations were observed throughout this work and particularly in the recovered acid fractions from the di-n-amylamine salt of the highest melting fraction of the pinabietic acid. This was due presumably to the fact that dehydro and dihydro abietic acid crystallize together with Steele's abietic acid in amounts depending upon the concentrations of solutions used in the recrystallizations and hence can not be separated by fractional crystallization alone. This has been recognized by the experts in the art as reference to Hasselstrom (U. S. Patent No. 2,072,628) Fieser and Campbell [J. A. C. S. 60 2631 (1938)] Fleck and Palkin [ibid., 60, 2621 (1938)] will clearly show.

As a result of this re-investigation of pinabietic acid it has become evident that pinabietic acid is not a chemical individual but a mixture of dehydroabietic acid ($C_{20}H_{28}O_2$), dihydroabietic acid ($C_{20}H_{32}O_2$), Steele's abietic acid ($C_{20}H_{30}O_2$) and d-pimaric acid. These three types of abietic acid exhibit a varying stability to atmospheric conditions. Consequently materials such as Steele's abietic acid or materials rich in such acids as those of common rosin or materials rich in the resin acids of tall oil press cake are not stable to atmospheric conditions or when exposed to oxygen. However, crude tall oil and tall oil press cake can be converted into a stable form by treatment in accordance with the principles of the present invention. Thus, it has been found that the solids separated from the liquid portion of sulfate tall oil can be melted together during a period of about 6 to about 12 hours to form a product which may be used as a substitute for rosin. By treatment under carefully controlled conditions and distillation of the product so obtained, it is possible to obtain a product the resin acids of which have a marked stability to the atmosphere and particularly to oxygen.

Broadly stated, my new oxygen stable or stable tall oil products may be produced by heating the crude sulfate tall oil, refined sulfate tall oil and/or press cake obtained as described hereinbefore to temperatures of about 200°–about 300° centigrade and distilling the product under a medium vacuum at temperatures of about 240°–about 260° centigrade. The product so obtained is substantially devoid of Steele's abietic acid, $C_{20}H_{30}O_2$, but does contain dehydroabietic acid $C_{20}H_{28}O_2$, dihydroabietic acid $C_{20}H_{32}O_2$, abietenes, fatty acids, sterols and ligneous matter. In order that those skilled in the art may have a better understanding of the principles of the present invention, the following description of preferred embodiments thereof is provided.

Press cake obtained as hereinbefore described is heat treated for from 1 to 24 hours or until the resin acids of the abietic type have substantially undergone a rearrangement of disproportionation of hydrogen and is substantially devoid of Steele's abietic acid. My novel stable solid tall oil rosin can likewise be obtained by heat treating crude tall oil or refined tall oil (U. S. Patent No. 1,986,817) for from 2 to 24 hours to 200 to 300° centigrade and then distilling under a vacuum of about 10 millimeters of mercury. The product obtained as a distillate between the temperatures of about 220° C. to about 280° C. has a positive sign of rotation and provides a mixture of fatty acids, sterols, ligneous matter, abietenes, dehydroabietic acid and is substantially devoid of Steele's abietic acid. The presence of the abietenes probably is due to the decarboxylation of the Steele's abietic acid originally in the tall oil.

My novel product can also be obtained by distilling sulfate tall oil press cake under a medium vacuum of about 5 to about 100 millimeters of mercury and segregating that portion of the distillate which distills over at about 240° centigrade say from about 240° centigrade to about 280° centigrade. This distillation should be carried out at a rate such that about 6 to about 8 hours is required for the distillation of about 5 kilos of solids when the distillation is carried out in the usual laboratory size equipment. Of course it is to be appreciated that with larger quantities and larger equipment, the time of distillation will be more or less proportionate. In other words it is essential to submit the crude material to a heat treatment of about 1 to about 24 hours and the speed of distillation should be controlled in accordance with this critical feature of my invention.

It was found that a more convenient method for commercial use for isolating the resin acids from the press cake is as follows: The press cake is distilled under a vacuum at about 10 to 80 mm. pressure and at a temperature of about 240 to 280° C. This procedure is carried out for a prolonged period, preferably about 4 to about 10 hours. The distillate obtained from the foregoing operation contains a rosin substitute having a light color. The rosin substitute which is thus obtained is more stable to light and air than common wood or gum rosin known as colophony. In other words, the present invention provides a superior grade of rosin substitute. Of course the product may be further purified if desirable.

For the purpose of giving those skilled in the art a better understanding of means for carrying the invention into practice, the following illustrative examples will be given:

EXAMPLE No. 1

About 200 grams of solids separated from the refined tall oil (sulfate tall oil press cake) is subjected to distillation at 20 mm. pressure and the following fractions are obtained from the distillate:

1. A fraction up to about 238° C. yields about 48.0 grams of higher fatty acids and decomposition products.
2. A fraction from about 240 to about 260° C. yields about 143.5 grams of water white solid rosin substitute.
3. A residue of pitch amounting to about 20.0 grams.

EXAMPLE No. 2

About 700 grams of solids obtained from the refined tall oil as set forth hereinabove and having an acid number of 176.6 was subjected to distillation for about 6 hours under the following conditions to produce the following fractions:

1. A fraction at a temperature of about 254° C. and under a pressure about 40 mm. of mercury gives a yield 50 grams of fatty acids with an acid number of 267.4.
2. A fraction at a temperature of about 254 to about 257° C. and under a pressure of about 80 mm. of mercury gives a yield of about 100 grams of fatty acids with an acid number of 140.9.
3. A fraction at a temperature of about 256 to about 278° C. and under a pressure of about 80 mm. of mercury gives a yield of about 280 grams soft rosin substitute with an acid number of 143.9.
4. A residue of pitch remained amounting to about 84 grams and having a low acid number.

Fraction 2 of Example 1 and Fraction 3 of Example 2 provide my new stable solid sulfate tall oil rosin.

EXAMPLE No. 3

About 1000 grams of crude sulfate tall oil were heated to about 200° to about 300° centigrade and maintained at that temperature for about 10 hours. The heat treated crude sulfate tall oil was then subjected to distillation under a vacuum of about 40 millimeters of mercury and that portion of the distillate distilling at about 240° to about 280° centigrade isolated. This fraction of the distillate is my novel stable solid tall oil rosin.

EXAMPLE No. 4

About 100 grams of press cake were subjected to heat treatment at about 280° centrigrade for about 3 to about 4 hours. The product thus obtained is substantially devoid of Steele's abietic acid and contains dehydroabietic acid and dihydroabietic acid.

My new stable sulfate tall oil rosin comprises about 2 to about 35% dehydroabietic acid and about 1 to about 50% of fatty acids, sterols, ligneous matter and abietenes, but is substantially devoid of Steele's abietic acid. My new stable solid sulfate tall oil rosin being rich in dehydroabietic acid is exceedingly stable to oxidation or the action of the atmosphere. This is readily appreciated by an examination of the following table obtained as a result of treating approximately equal amounts of the various materials listed therein with oxygen. In performing this comparative test of the stability of my novel stable solid sulfate tall oil rosin, the aforesaid tall oil rosin was subjected to recrystallization from methanol and approximately 5 gram samples of the pulverized crystals rich in dehydroabietic acid, $C_{20}H_{28}O_2$, were exposed to a stream of oxygen. The table below gives the percentage gain in weight per 5 gram sample of each material after exposure to the stream of oxygen for the indicated period of time.

*Stability test*

(Percentage gain of approximately 5 gram samples in oxygen stream)

| Hours | Steele's acid $C_{20}H_{30}O_2$ | Pin-abietic acid | Pure dehydro-abietic acid $C_{20}H_{28}O_2$ | Gum rosin | Tall oil crystals rich in $C_{20}H_{28}O_2$ |
|---|---|---|---|---|---|
| | Percent | Percent | Percent | Percent | Percent |
| 24 | 0.564 | 0.162 | 0.000 | 0.292 | −0.030 |
| 48 | 0.823 | 0.116 | −0.018 | 0.080 | −0.014 |
| 72 | 0.978 | 0.156 | −0.008 | 0.178 | −0.000 |
| 96 | 1.070 | 0.112 | −0.004 | 0.148 | −0.002 |
| 120 | 0.892 | 0.134 | +0.006 | 0.154 | 0.004 |
| 144 | 0.876 | 0.130 | 0.000 | 0.156 | 0.000 |
| 168 | 0.760 | 0.134 | 0.002 | 0.232 | 0.004 |

Those skilled in the art will appreciate that my novel stable solid sulfate tall oil rosin is far more stable than Steele's abietic acid, pinabietic acid or gum rosin and has a stability at least equal to pure dehydroabietic acid. My new product, to wit: the new stable solid sulfate tall oil rosin provides a superior product for incorporation in soaps, lubrication greases, etc.

Although the present invention has been described in conjunction with certain preferred embodiments it is to be understood that variations and modifications thereof may be made as those skilled in the art will readily understand. Such variations and modifications I consider to be within the purview of the specification and the scope of the appended claims. Thus it is to be understood that the term "heat treated" as employed in the appended claims defines a material derived from crude sulfate tall oil which has been treated until the resin acids of the abietic type have substantially undergone rearrangement or disproportionation of hydrogen. For example, solid crude tall oil resin contains the resin acid having an elemental formula approximately $C_{20}H_{30}O_2$ and having a negative sign of optical rotation, whereas heat treated solid crude tall oil resin contains a resin acid having a positive sign of optical rotation. Furthermore, solid crude sulfate tall oil resin contains Steele's abietic acid whereas heat treated solid crude sulfate tall oil resin is substantially devoid of Steele's abietic acid. It is likewise to be observed that my new stable sulfate tall oil products are not to be confused with the products of the processes disclosed in U. S. Patents Nos. 1,593,656, 1,810,472, 1,997,171, 1,940,372, 1,826,224, 1,921,566, 1,888,581 and 2,012,125, since all the products of the processes described in the foregoing patents contain Steele's abietic acid and are practically devoid of dehydroabietic acid. That is to say, the products produced by the processes described in the foregoing patents contain less than about 2% of dehydroabietic acid. Similarly, the heat treatment of wood rosin as described in U. S. Patent 1,643,276 provides a product containing less than 10% dehydroabietic acid and containing appreciable amounts of Steele's abietic acid. Furthermore artificial cooling or refrigeration may be used in the first operation in order to effect a separation of certain of the constituents from the crude tall oil. It is to be observed, however, that temperatures lower than about minus 10° C. should not be employed. Other modes of separating my refined or super-refined tall oil from the undersirable solid constituents mentioned hereinabove may be employed, such as vacuum distillation with or without the use of steam. Furthermore, filter aids, such as kieselguhr, silo-cel, diatomaceous earth, and the like, may be employed to facilitate filtration or separation of the undesired solid constituents.

It is to be noted that the raw material or crude tall oil soap is obtained from black liquor of the sulfate process of paper or pulp making. This pulping process is well known to chemists and is not to be confused with the sulfite process or other processes. The liquor obtained from these processes would not yield my stable tall oil products.

The present application is a continuation in part of my co-pending application, Serial No. 845, filed on January 8, 1935, which matured into U. S. Patent No. 2,190,660 on February 20, 1940.

I claim:

1. A process for producing sulfate tall oil and sulfate tall oil products stabilized to oxygen-containing gases which comprises heating at least one of the group consisting of crude sulfate tall oil, refined sulfate tall oil and the solids separated from crude sulfate tall oil after said crude sulfate tall oil stands at atmospheric temperatures for a period of time of about 2 days to about 10 days, said heating being carried out between about 200° C. and about 300° C. for about 1 to about 24 hours, whereby the resinic portions of the heat treated material unstable to oxygen-containing gases are converted to oxygen-stable substances and a product is produced which is substantially devoid of Steele's abietic acid and contains dehydroabietic acid in amounts of about 2% to about 35% of the resinic portion of the heat treated material.

2. A process for producing a sulfate tall oil derivative stable to air which comprises subjecting crude sulfate tall oil to a temperature of about 200 to about 300° C. for about 10 hours to obtain heat treated sulfate tall oil, subjecting said heat treated sulfate tall oil to distillation under a vacuum of about 40 millimeters of mercury and separating a fraction of the distillate distilling at about 240° C. to about 280° C. at the aforesaid pressure whereby a stable solid tall oil rosin is obtained being substantially devoid of Steele's abietic acid and containing more than about 2% of dehydroabietic acid.

3. A process for producing sulfate tall oil rosin substantially devoid of Steele's abietic acid which comprises heating solids separated from crude sulfate tall oil after cooling and settling at a temperature of about 280° C. for about 3 to about 4 hours, whereby sulfate tall oil rosin is obtained substantially devoid of Steele's abietic acid and containing dihydroabietic acid and more than about 2% of dehydroabietic acid.

4. As a new article of manufacture, a heat treated sulphate tall oil product selected from the group consisting of heat treated crude sulphate tall oil, heat treated refined sulphate tall oil, heat treated solid crude sulphate tall oil resin and mixtures of the aforesaid, said heat treated sulphate tall oil product being substantially devoid of Steele's abietic acid, but characterized by an increase in weight of not more than about 0.004% when 5 grams of said product recrystallized from methanol are exposed to the action of a stream of oxygen for about 120 hours and the resinic portion of said heat treated sulphate tall oil product containing about 2% to about 35% dehydroabietic acid.

5. As a new article of manufacture, heat treated sulfate tall oil stabilized to oxygen-containing gases, the resinic portion of said tall oil containing about 2% to about 35% dehydroabietic acid, being substantially devoid of Steele's abietic acid and being stabilized to oxygen containing gases.

6. As a new article of manufacture a fraction of sulfate tall oil distilling at about 240° C. to about 260° C. under a medium vacuum containing abietenes, fatty acids, sterols, ligneous matter, dihydroabietic acid and dehydroabietic acid and being substantially devoid of Steele's abietic acid; the dehydroabietic acid being present in amounts of about 2% to about 35% of the resinic portion of said fraction.

7. As a new article of manufacture, heat treated solid crude sulphate tall oil resin, said heat treated solid crude sulphate tall oil resin being substantially devoid of Steele's abietic acid and the resinic portion of said heat treated solid crude sulphate tall oil resin containing about 2% to about 35% dehydroabietic acid.

8. As a new article of manufacture, a fraction of heat treated solid crude sulphate tall oil resin having a distillation range of about 240° C. to about 280° C. at a pressure of about 5 to 100 millimeters of mercury, being substantially devoid of Steele's abietic acid and containing sterols, ligneous matter, abietenes and dehydroabietic acid.

9. As a new article of manufacture, a fraction of heat treated solid crude sulphate tall oil resin having a distillation range of about 220° C. to about 280° C. at 10 millimeters of mercury, having a positive sign of optical rotation and comprising fatty acids, sterols, ligneous matter, abietenes, dehydroabietic acid and being substantially devoid of Steele's abietic acid.

TORSTEN HASSELSTROM.